United States Patent
Walker et al.

(10) Patent No.: US 7,761,901 B2
(45) Date of Patent: Jul. 20, 2010

(54) DATA TRANSMISSION

(75) Inventors: Matthew D Walker, Suffolk (GB); Eduardo Urzaiz, Ipswich (GB)

(73) Assignee: British Telecommunications plc, London (GB)

( * ) Notice: Subject to any disclaimer, the term of this patent is extended or adjusted under 35 U.S.C. 154(b) by 678 days.

(21) Appl. No.: 10/549,582

(22) PCT Filed: Mar. 8, 2004

(86) PCT No.: PCT/GB2004/000974

§ 371 (c)(1),
(2), (4) Date: Sep. 19, 2005

(87) PCT Pub. No.: WO2004/084520

PCT Pub. Date: Sep. 30, 2004

(65) Prior Publication Data

US 2006/0182016 A1    Aug. 17, 2006

(30) Foreign Application Priority Data

Mar. 19, 2003   (GB)   ................................. 0306296.5

(51) Int. Cl.
    *H04N 7/173*    (2006.01)
    *G06F 15/16*    (2006.01)
(52) U.S. Cl. .......................... 725/95; 725/96; 709/228; 709/231; 709/232
(58) Field of Classification Search ................. 725/118; 370/232
    See application file for complete search history.

(56) References Cited

U.S. PATENT DOCUMENTS 4,813,044 A    3/1989    Kumar et al.
5,140,417 A    8/1992    Tanaka et al.
5,159,447 A    10/1992   Haskell et al.
5,363,138 A    11/1994   Hayashi et al.

(Continued)

FOREIGN PATENT DOCUMENTS

EP    0418396 A1    3/1991

(Continued)

OTHER PUBLICATIONS

Naoki Wakayama et al., "On TCP-friendly Video Transfer", IEICE Technical Report, vol. 99 No. 428, Nov. 15, 1999, pp. 79-84.

(Continued)

*Primary Examiner*—John W Miller
*Assistant Examiner*—Robert Hance
(74) *Attorney, Agent, or Firm*—Nixon & Vanderhye PC

(57) ABSTRACT

Data to be transmitted over a network includes a first part (perhaps audio) which is always to be transmitted and alternative second parts (perhaps video coded at different compression rates) of which one is to be chosen for transmission, depending on the current network capacity. In order to accommodate systems where (owing perhaps to the use of a congestion control mechanism such as TCP) the capacity available is initially undetermined, one firstly begins to transmit just the first part. When the network capacity becomes known (typically by monitoring the performance of the network in transmitting the first part), one of the alternative second parts is chosen and transmission of it commences. If desired this may initially be preferentially to, or to the exclusion of, further transmission of the first part.

4 Claims, 2 Drawing Sheets

U.S. PATENT DOCUMENTS

| | | | |
|---|---|---|---|
| RE34,824 E | 1/1995 | Morrison et al. | |
| 5,511,054 A | 4/1996 | Oishi et al. | |
| 5,535,209 A | 7/1996 | Glaser et al. | |
| 5,561,466 A | 10/1996 | Kiriyama | |
| 5,566,208 A | 10/1996 | Balakrishnan | |
| 5,675,696 A | 10/1997 | Ishimoto et al. | |
| 5,706,504 A | 1/1998 | Atkinson et al. | |
| 5,748,955 A | 5/1998 | Smith | |
| 5,751,741 A | 5/1998 | Voith et al. | |
| 5,754,849 A | 5/1998 | Dyer et al. | |
| 5,818,818 A | 10/1998 | Soumiya et al. | |
| 5,822,524 A | 10/1998 | Chen et al. | |
| 5,864,678 A | 1/1999 | Riddle | |
| 5,874,997 A | 2/1999 | Haigh | |
| 5,892,881 A | 4/1999 | Takishima et al. | |
| 5,898,671 A | 4/1999 | Hunt | |
| 5,909,434 A | 6/1999 | Odenwalder et al. | |
| 5,915,130 A | 6/1999 | Kim | |
| 5,918,020 A | 6/1999 | Blackard et al. | |
| 5,928,330 A | 7/1999 | Goetz et al. | |
| 5,956,321 A | 9/1999 | Yao et al. | |
| 5,960,452 A | 9/1999 | Chi | |
| 6,011,779 A | 1/2000 | Wills | |
| 6,014,694 A * | 1/2000 | Aharoni et al. | 709/219 |
| 6,014,706 A | 1/2000 | Cannon et al. | |
| 6,023,732 A | 2/2000 | Moh et al. | |
| 6,061,732 A | 5/2000 | Korst et al. | |
| 6,065,104 A | 5/2000 | Tng | |
| 6,081,843 A | 6/2000 | Kikki et al. | |
| 6,092,115 A | 7/2000 | Choudhury et al. | |
| 6,097,697 A | 8/2000 | Yao et al. | |
| 6,104,441 A | 8/2000 | Wee et al. | |
| 6,122,668 A * | 9/2000 | Teng et al. | 709/231 |
| 6,124,878 A | 9/2000 | Adams et al. | |
| 6,181,821 B1 | 1/2001 | Lim | |
| 6,216,173 B1 | 4/2001 | Jones et al. | |
| 6,226,329 B1 | 5/2001 | Ishibashi | |
| 6,269,078 B1 | 7/2001 | Lakshman et al. | |
| 6,269,978 B1 | 8/2001 | Sindoni | |
| 6,275,534 B1 | 8/2001 | Shiojiri | |
| 6,285,661 B1 | 9/2001 | Zhu et al. | |
| 6,310,857 B1 | 10/2001 | Duffield et al. | |
| 6,324,165 B1 | 11/2001 | Fan et al. | |
| 6,373,855 B1 * | 4/2002 | Downing et al. | 370/468 |
| 6,411,602 B2 | 6/2002 | Schoenblum et al. | |
| 6,430,620 B1 | 8/2002 | Omura et al. | |
| 6,470,378 B1 * | 10/2002 | Tracton et al. | 709/203 |
| 6,480,541 B1 | 11/2002 | Girod et al. | |
| 6,487,528 B1 | 11/2002 | Vossing et al. | |
| 6,493,388 B1 | 12/2002 | Wang | |
| 6,501,797 B1 | 12/2002 | van der Schaar et al. | |
| 6,532,242 B1 | 3/2003 | Tahara | |
| 6,573,907 B1 * | 6/2003 | Madrane | 715/719 |
| 6,593,930 B1 | 7/2003 | Sheaffer et al. | |
| 6,614,843 B1 | 9/2003 | Gordon et al. | |
| 6,618,363 B1 | 9/2003 | Bahl | |
| 6,618,381 B1 | 9/2003 | Miyamoto et al. | |
| 6,625,119 B1 | 9/2003 | Schuster et al. | |
| 6,637,031 B1 | 10/2003 | Chou | |
| 6,640,086 B2 | 10/2003 | Wall | |
| 6,661,777 B1 | 12/2003 | Blanc et al. | |
| 6,697,369 B1 | 2/2004 | Dziong et al. | |
| 6,700,893 B1 | 3/2004 | Radha et al. | |
| 6,701,372 B2 | 3/2004 | Yano et al. | |
| 6,731,097 B1 | 5/2004 | Richards et al. | |
| 6,738,386 B1 | 5/2004 | Holmqvist | |
| 6,744,815 B1 | 6/2004 | Sackstein et al. | |
| 6,754,189 B1 | 6/2004 | Cloutier et al. | |
| 6,810,425 B2 * | 10/2004 | Yamamoto | 709/233 |
| 6,813,275 B1 | 11/2004 | Sharma et al. | |
| 6,850,564 B1 | 2/2005 | Pejhan et al. | |
| 6,909,693 B1 | 6/2005 | Firoiu et al. | |
| 6,920,178 B1 | 7/2005 | Curet et al. | |
| 6,940,903 B2 | 9/2005 | Zhao et al. | |
| 6,993,075 B2 | 1/2006 | Kim et al. | |
| 6,993,604 B2 | 1/2006 | Dixon | |
| 7,058,723 B2 | 6/2006 | Wilson | |
| 7,106,758 B2 | 9/2006 | Belk et al. | |
| 7,116,714 B2 | 10/2006 | Hannuksela | |
| 7,142,509 B1 | 11/2006 | Rovner et al. | |
| 7,191,246 B2 | 3/2007 | Deshpande | |
| 2001/0001614 A1 | 5/2001 | Boice et al. | |
| 2001/0028463 A1 | 10/2001 | Iwamura | |
| 2001/0040700 A1 | 11/2001 | Hannuksela et al. | |
| 2002/0007416 A1 | 1/2002 | Putzolu | |
| 2002/0009096 A1 | 1/2002 | Odenwalder | |
| 2002/0010938 A1 | 1/2002 | Zhang et al. | |
| 2002/0016827 A1 | 2/2002 | McCabe et al. | |
| 2002/0038374 A1 * | 3/2002 | Gupta et al. | 709/231 |
| 2002/0041585 A1 | 4/2002 | Bahl | |
| 2002/0057889 A1 | 5/2002 | Ando et al. | |
| 2002/0083184 A1 | 6/2002 | Elliott | |
| 2002/0114292 A1 | 8/2002 | Kawabata et al. | |
| 2002/0131496 A1 * | 9/2002 | Vasudevan et al. | 375/240.11 |
| 2002/0167942 A1 * | 11/2002 | Fulton | 370/352 |
| 2003/0037158 A1 | 2/2003 | Yano et al. | |
| 2003/0072370 A1 | 4/2003 | Girod et al. | |
| 2003/0076858 A1 * | 4/2003 | Deshpande | 370/468 |
| 2003/0103515 A1 | 6/2003 | Brown et al. | |
| 2003/0153311 A1 | 8/2003 | Black | |
| 2003/0169932 A1 * | 9/2003 | Li et al. | 382/239 |
| 2003/0174609 A1 | 9/2003 | Choi | |
| 2004/0078460 A1 * | 4/2004 | Valavi et al. | 709/224 |
| 2004/0114684 A1 | 6/2004 | Karczewicz et al. | |
| 2004/0153951 A1 | 8/2004 | Walker et al. | |
| 2004/0181817 A1 * | 9/2004 | Larner | 725/143 |
| 2004/0190600 A1 | 9/2004 | Odenwalder | |
| 2005/0010697 A1 * | 1/2005 | Kinawi et al. | 710/1 |
| 2005/0021830 A1 | 1/2005 | Urzaiz et al. | |
| 2005/0044254 A1 * | 2/2005 | Smith | 709/231 |
| 2005/0120038 A1 | 6/2005 | Jebb et al. | |
| 2005/0172028 A1 | 8/2005 | Nilsson et al. | |
| 2006/0133514 A1 | 6/2006 | Walker | |
| 2006/0171666 A1 | 8/2006 | Im | |
| 2008/0250454 A1 | 10/2008 | Nishina et al. | |
| 2009/0133075 A1 | 5/2009 | Nishina et al. | |

FOREIGN PATENT DOCUMENTS

| | | |
|---|---|---|
| EP | 0763944 A2 | 3/1997 |
| EP | 0 939 545 A2 | 9/1999 |
| EP | 0948211 A2 | 10/1999 |
| EP | 1045555 A2 | 10/2000 |
| EP | 1120966 A2 | 8/2001 |
| EP | 1128610 A2 | 8/2001 |
| EP | 1130921 A1 | 9/2001 |
| EP | 1241891 A | 9/2002 |
| GB | 2363277 A | 12/2001 |
| GB | 2367219 A | 3/2002 |
| JP | 07-123172 | 5/1995 |
| JP | 7-236136 | 9/1995 |
| JP | 7-264580 | 10/1995 |
| JP | 09093553 A * | 4/1997 |
| JP | 9-261613 | 10/1997 |
| JP | 9-298734 | 11/1997 |
| JP | 10-126771 | 5/1998 |
| JP | 10-164533 | 6/1998 |
| JP | 10-262245 | 9/1998 |
| JP | 11-164270 | 6/1999 |
| JP | 11-184780 | 7/1999 |
| JP | 11-187367 | 7/1999 |
| JP | 11-308271 | 11/1999 |
| JP | 11-313301 | 11/1999 |
| JP | 2000-151705 | 5/2000 |

| | | |
|---|---|---|
| JP | 2001-144802 | 5/2001 |
| KR | 2000-28335 | 5/2000 |
| WO | WO 98/26604 | 6/1998 |
| WO | 00/01151 | 1/2000 |
| WO | WO 00/01151 | 1/2000 |
| WO | 00/35201 | 6/2000 |
| WO | WO 00/41365 | 7/2000 |
| WO | WO 00/49810 | 8/2000 |
| WO | WO 00/62552 | 10/2000 |
| WO | WO 01/39508 A1 | 5/2001 |
| WO | WO 02/054776 A1 | 7/2002 |

OTHER PUBLICATIONS

Kurceren R. et al: "Improved SP-frame Encoding. VCEG-M73." ITU Telecommunications Standardization Sector Video Coding Experts Group, Apr. 2, 2001, pp. 1-5.
Office Action dated Oct. 3, 2008 in U.S. Appl. No. 10/507,111.
Office Action dated Dec. 17, 2007 in U.S. Appl. No. 10/507,111.
Office Action dated Aug. 16, 2007 in U.S. Appl. No. 10/507,826.
Office Action dated Mar. 25, 2008 in U.S. Appl. No. 10/507,826.
Office Action dated Sep. 4, 2008 in U.S. Appl. No. 10/507,826.
Office Action dated Dec. 11, 2006 in U.S. Appl. No. 10/415,819.
Office Action dated Jul. 25, 2007 in U.S. Appl. No. 10/415,819.
Office Action dated Mar. 20, 2008 in U.S. Appl. No. 10/415,819.
Office Action dated Jan. 2, 2009 in U.S. Appl. No. 10/415,819.
Office Action dated Aug. 22, 2006 in U.S. Appl. No. 10/508,122.
Office Action dated Feb. 20, 2007 in U.S. Appl. No. 10/508,122.
Office Action dated Aug. 14, 2007 in U.S. Appl. No. 10/508,122.
Office Action dated Nov. 1, 2007 in U.S. Appl. No. 10/508,122.
Office Action dated Jun. 20, 2008 in U.S. Appl. No. 10/508,122.
Office Action dated Dec. 30, 2008 in U.S. Appl. No. 10/508,122.
Office Action dated Aug. 27, 2007 in U.S. Appl. No. 10/488,345.
Office Action dated Feb. 1, 2008 in U.S. Appl. No. 10/488,345.
Office Action dated Sep. 11, 2008 in U.S. Appl. No. 10/488,345.
Sullivan et al., "Using the Draft H.26L Video Coding Standard for Mobile Applications," IEEE Image Processing 2001 International Conference.
Office Action dated Jun. 23, 2009 in U.S. Appl. No. 10/488,345.
Office Action dated Apr. 13, 2009 in U.S. Appl. No. 10/508,122.
Office Action dated Jun. 25, 2009 in U.S. Appl. No. 10/507,826.
Sugh-Hoon Lee, "Retransmission Scheme for MPEG Streams in Mission Critical Multimedia Applications", 1998 IEEE.
European Search Report—Oct. 11, 2002.
International Search Report—Jul. 5, 2004.
International Search Report—Jun. 21, 2002.
International Search Report—May 21, 2003.
International Search Report—Dec. 10, 2002.
Rejaie et al., "Architectural Considerations for Playback of Quality Adaptive Video Over the Internet", IEEE International Conference on Networks. Icon. Proceedings of Icon, XX, XX, Sep. 5, 2000, pp. 204-209.
Rejaie et al., "Layered Quality Adaptation for Internet Video Streaming", IEEE Journal on Selected Areas in Communications, Dec. 2000, IEEE, USA, vol. 18, No. 12, pp. 2530-2543.
Floyd, "Connections with Multiple Congested Gateways in Packet-Switched Networks. /Part 1: One-Way Traffic", Computer Communications Review Association for Computing Machinery, New York, US, vol. 21, No. 5, Oct. 1, 1991, pp. 30-47.
Sisalem et al., "MLDA: A TCP-Friendly Congestion Control Framework for Heterogeneous Multicast Environments", International Workshop on Quality of Service (IWQOS)—Conference Proceedings Article, Jun. 5, 2000, pp. 65-74.
Kurceren et al., Synchronization-Predictive Coding for Video Compression: The SP Frames Design for JVT/H.26L, IEEE ICIP 2002.
Nilsson et al., "Layered Audiovisual Coding for Multicast Distribution on IP Networks", pp. 1-10, 1999.
Walker et al., A Study of the Efficiency of Layered Video Coding Using H.263, Apr. 2004, http://research.btexact.com/edge/papers/focuspapers/QoSForRealTimeApp/pv99/.
Pearson, Viewer Response to Time-Varying Video Quality, , pp. 16-25, Part of the IS&T/SPIE Conference on Human Vision and Electronic Imaging III, San Jose, California, Jan. 1998, SPIE vol. 3299, 0277-786X/98/$10.00.
Ghanbari, Two-Layer Coding of Video Signals for VBR, IEEE Journal on Selected Areas in Communications, vol. 7, No. 5, Jun. 1989.
Rejaie et al., "RAP: An End-to-End Rate-Based Congestion Control Mechanism for Realtime Streams in the Internet", University of Southern California, Information Sciences Institute, Marina Del Rey, CA 90292, {reza, mjh, estrin}@isi.edu , 1999.
Rejaie et al, "Quality Adaptation for Congestion Controlled Video Playback over the Internet", Information Sciences Institute, University of Southern California, estrin@isi.edu, 1999.
McCanne et al., "Receiver-Driven Layered Multicast", University of California, Berkeley, martin@eecs.berkeley.edu, 1996.
Vicisano et al., "TCP-Like Congestion Control for Layered Multicast Data Transfer", Dept. of Computer Science, University College, London, Gower Street, London WC1 6BT, UK, 1998.
Mahdavi et al., "TCP-Friendly Unicast Rate-Based Flow Control", Nov. 2003, ttp://www.psc.edu/networking/papers/tcp_ friendly.html.
Allman, "TCP Congest control", XP002190151, Network Working Group, Request for Comments: 2581, Obsoletes: 2001, Category: Standards Track.
Karczewicz et al., "A Proposal for SP-Frames", ITU—Telecommunications Standardization Sector, Study Group 16 Question 6, Video Coding Experts Group (VCEG), Generated Jan. 4, 2001.
Postel, Transmission Control Protocol, Prepared for Defense Advanced Research Projects Agency, Information Processing Techniques Office, 1400 Wilson Boulevard, Arlington, Virginia 22209, Jan. 1980.
International Search Report—Dec. 16, 2002.
Bolot et al.; "Experience with Control Mechanisms for Packet Video in the Internet", XP000751635, Computer Communication Review, ACM SIGCOMM, 2004, pp. 4-15.

* cited by examiner

DATA TRANSMISSION

CROSS-REFERENCE TO RELATED APPLICATIONS

This application is the US national phase of international application PCT/GB2004/000974 filed 8 Mar. 2004 which designated the U.S. and claims benefit of GB 0306296.5, dated 19 Mar. 2003, the entire content of which is hereby incorporated by reference.

BACKGROUND OF THE INVENTION

1. Technical Field

This invention is concerned with transmission of data from a sending station to a receiving terminal. More particularly, it envisages transmission over a telecommunications network where the transmitted bit-rate that the network can support is initially undetermined.

2. Related Art

The situation addressed can arise, for example, when the rate fluctuates owing to the use of a congestion control mechanism. For example, the TCP/IP system uses IP (Internal Protocol) for transport. This is a connectionless service and simply transports transmitted packets to a destination. TCP (Transmission Control Protocol) is an overlay to this service and brings in the idea of a connection; the sending station transmits a packet and waits for an acknowledgement from the receiving terminal before transmitting another (or in the event of no acknowledgement within a timeout period, it retransmits the packet). More importantly (in the present context) it embodies a congestion control algorithm where it begins with a small packet size and progressively increases the packet size until packet loss occurs, whereupon it reduces the size again. After this initial "slow start" phase, the algorithm continues to increase the packet size (albeit more gradually) backing off whenever packet loss occurs; necessarily this involves some cyclic variation of the packet size. A description of TCP is to be found in "Computer Networks", by Andrew S. Tanenbaum, third edition, 1996, pp. 521-542.

Another common protocol is UDP (User Data Protocol). This does not have a congestion control mechanism of its own, but it has been proposed to add one to it, the so-called "TCP-Friendly Rate Protocol (TFRC) described in the Internet Engineering Task Force (IETF) document RFC3448. This aims to establish an average transmitting data rate similar to that which the TCP algorithm would have achieved, but with a smaller cyclic variation. It too exhibits the same "slow start" phase.

One drawback of this slow start system is that the transmitting station will not "know" what bit-rate the network will provide until the slow start phase is complete—which may take (depending on the round-trip time of the network) as much as several seconds. For some applications this does not matter, but in others it does: for example, when streaming video from a server which provides a choice of compression rates, the server cannot make an informed decision at the outset about which rate to choose. In the past, one method of dealing with this has been that the server starts by transmitting the lowest quality stream and switches up to a higher rate if and when it finds that the network can support it.

BRIEF SUMMARY OF THE INVENTION

It should be stressed that the invention does not require that either of the two protocols discussed above should be used; it does however start from the assumption that one is to transmit over a connection the bit-rate of which does not become apparent until after transmission has begun.

According to one aspect of the present invention there is provided a method of transmitting data over a network having initially undetermined transmission capacity, in which the data comprise a first part and at least two alternative second parts corresponding to respective different resolutions, for presentation at a receiving terminal simultaneously with the first part, comprising:

(a) transmitting at least an initial portion of the first part;

(b) receiving data indicative of the available transmission capacity;

(c) choosing among the alternative second parts, as a function of the data indicative of the available transmission capacity;

(d) transmitting the chosen second part and any remainder of the first part.

Other aspects of the invention are defined in the claims.

BRIEF DESCRIPTION OF THE DRAWINGS

Some embodiments of the invention will now be described, by way of example, with reference to the accompanying drawings, in which.

DETAILED DESCRIPTION OF EXEMPLARY EMBODIMENTS

Figure 1:
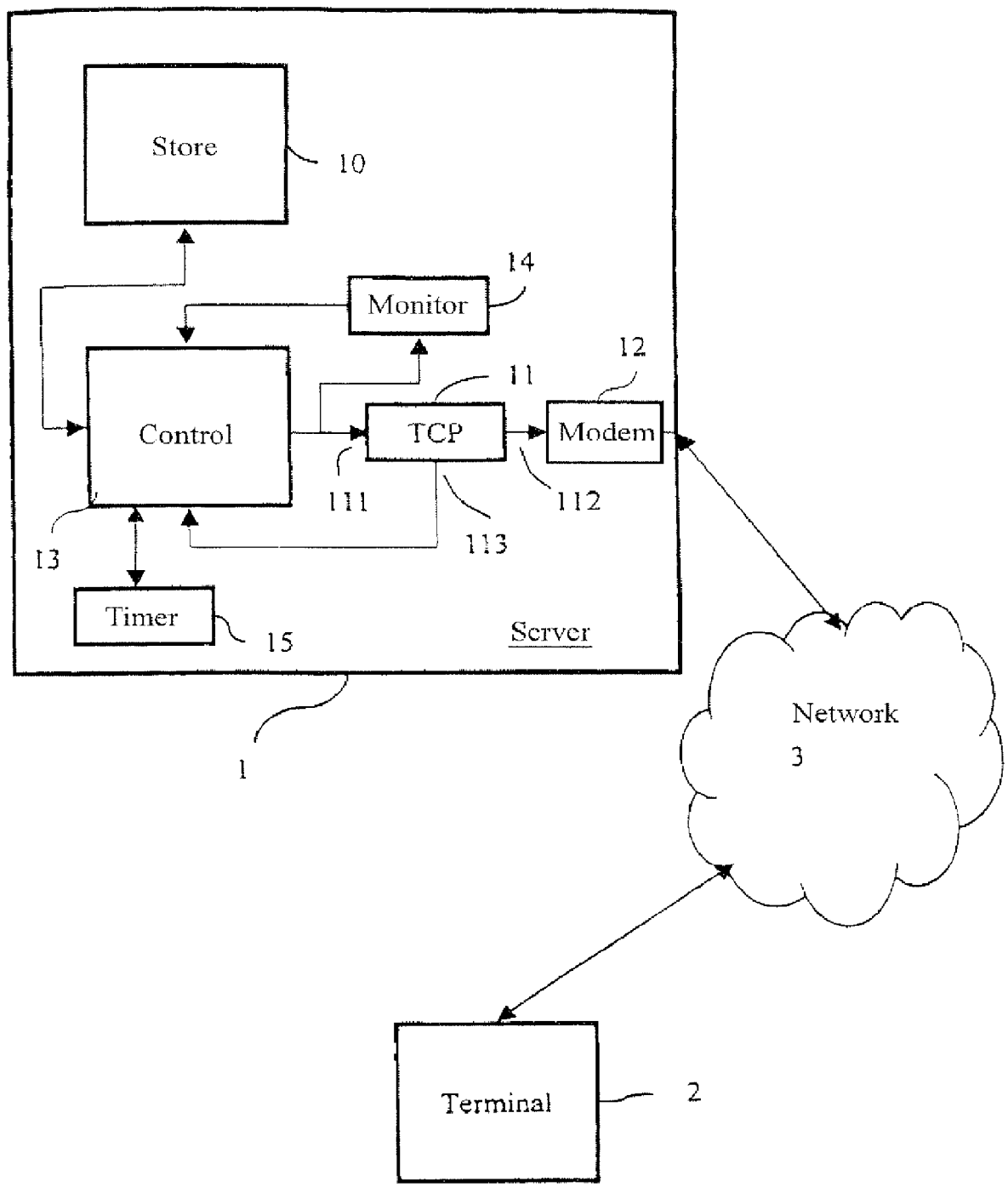
FIG. 1 is a block diagram of a transmission system in accordance with one embodiment of the invention.

In this first example, a server 1 is to stream video and audio to a receiving terminal 2 via a network 3. Supposing that this material is pre-recorded, then the audio data is contained in a file A stored in a store 10, along with several versions V1, V2, V3 of the video, encoded at different compression rates.

At this point some explanations are in order, to avoid confusion. Reference will be made to the rate of audio or video material. This refers to the average rate at which bits were generated by the original encoder, which (apart from possible small differences in frequency references at the transmitting and receiving ends) is also equal to the average rate at which bits are consumed by the ultimate decoder. Even in constant bit-rate video compression, the instantaneous bit-rate varies according to picture content but is smoothed to a constant rate by the use of buffering. By "transmitting bit-rate" we mean the actual rate at which data are transmitted by the transmitting station.

For the purposes of the present example, we suppose that the audio file A has been encoded by means of some suitable compression algorithm at 4.8 kbit/s, whilst the video files V1, V2, V3 are encoded at 10, 20 and 40 kbit/s respectively, perhaps using one of the well known encoding standards such as the ITU H.261, H.283, or one of the ISO MPEG algorithms.

The server 1 has a TCP interface 11, connected by a modem 12 to the network 3 such as the internet. The TCP interface is entirely conventional and will not be described further. It has an input 111 for data, an output 112 for sending data packets to the modem 12, and a control output 113 which indicates to the remainder of the server whether it is permitted to deliver further data to the input 111. A control unit 13 serves to read audio and video data from the store 10, and to deliver it to the input 111 of the TCP interface 11. The data delivered to the input is also monitored by a unit 14 whose function will be described later. There is also a timer 15.

It has already been explained in the introduction that initially the server has no information about the available transmitting rate that the TCP interface 11 can deliver on to the network, and in consequence is unable to make an informed decision as to which of the three alternative video files V1, V2, V3 it should send. The rationale of the operation of this server, noting that it has only one audio file and hence no choice as to audio bit-rate, is that it delivers audio only to the interface input 111, until such time as the slow start phase of the TCP is complete (or at least, has progressed sufficiently to enable a video rate decision to be made). The purpose of the rate monitoring unit 14 is to recognize when this point has been reached. In essence, it counts the bits delivered to the interface 11, and contains (or is connected to) a timer so that it can calculate the actual transmitting bit rate that this number of bits represents. This measurement could be made over one round-trip time, but, in order to smooth out oscillations of the bit rate, one might choose to average it over a time window that is however short enough that it does not delay the recognition process significantly. Typically one might use a window length corresponding to twice (or other low multiple) of the length of the round-trip time. Thus, the monitoring unit 13 has an output 131 which indicates the current transmitting bit-rate $R_T$.

Figure 2:
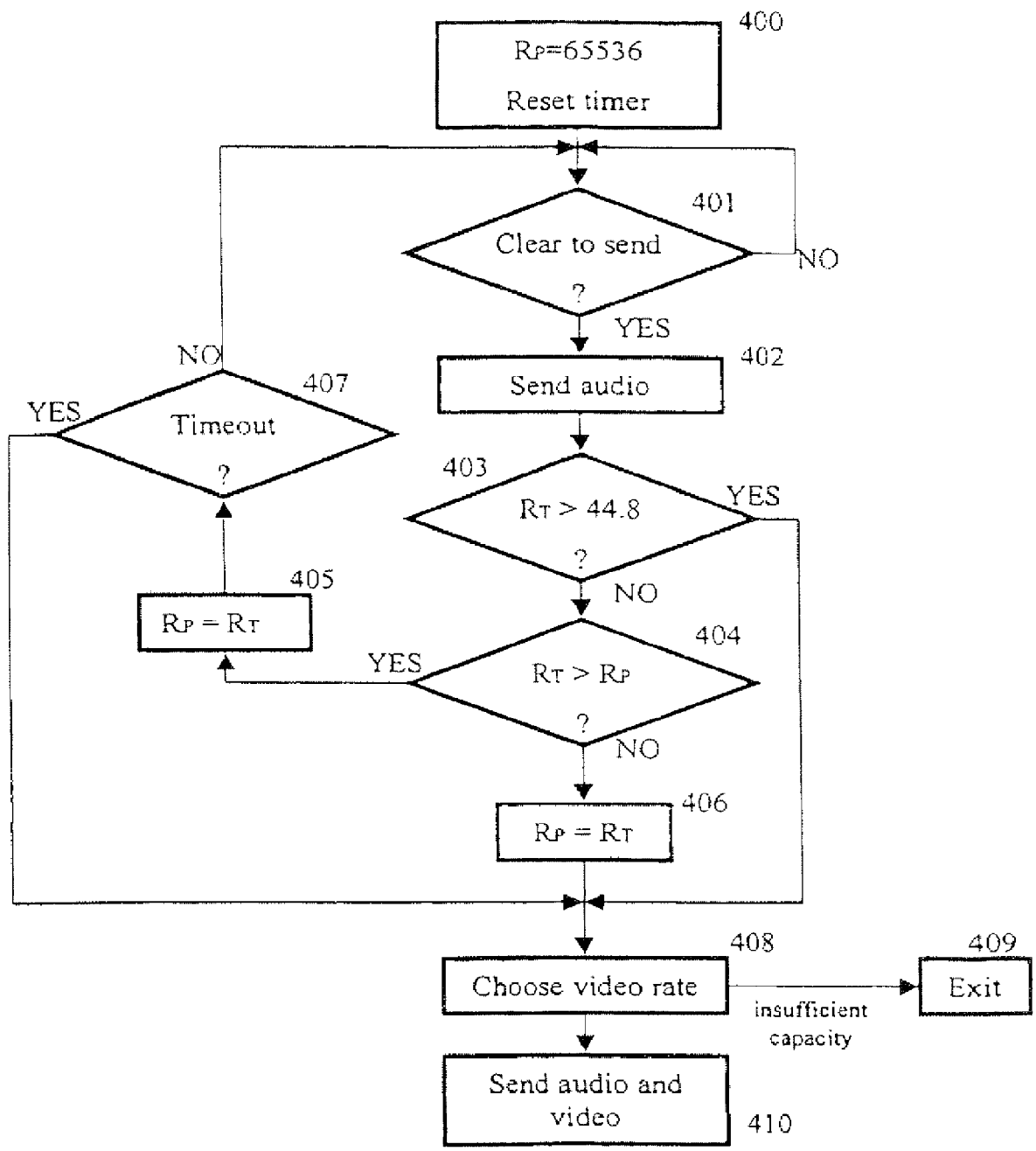
FIG. 2 is a flowchart illustrating the operation of the server shown in FIG. 1.

The system operation will now be described with reference to the flowchart shown in FIG. 2. Operation begins at Step 400, where a parameter $R_P$ representing the previous current transmitting rate is initialized to a high value, and the timer 15 is reset. At Step 401 the control unit tests the interface output 113 until it is clear to send data. Once this test is passed it reads (Step 402) audio data from the file A in the store 10 and transfers this to the interface 11. The interface 11 transmits this in accordance with normal TCP.

The control unit then interrogates the output of the monitoring unit 14 and performs some tests of the value of the current transmitting bit-rate $R_T$ and also of the timer 15 (although naturally it is not to be expected that these tests will be passed on the first iteration). Thus if (Step 403) the transmitting rate exceeds the rate needed to transmit audio plus full rate video (i.e. 44.8 kbit/s), further monitoring of the slow start phase becomes unnecessary and the process jumps to Step 408 (described below). If not, then at Step 404 $R_T$ is tested to determine whether it exceeds its previous value. If so it is assumed that the slow start phase is still in progress. $R_P$ is set equal to $R_T$ in Step 405 and the process is repeated from Step 401. If however $R_T \geq R_P$ then the slow start phase is deemed to have ended. $R_P$ is set equal to $R_T$ in Step 406 and the process moves on to a second phase. In the case of high round-trip times on the network, it can take a long time for the slow-start mechanism to conclude, and therefore also a test at Step 407 checks the state of the timer 15 and if this exceeds a maximum permitted waiting time the process moves on to the second phase where the video rate decision is then made on the basis of the known available transmitting bit-rate, even though this might not be the maximum.

This second phase begins with the control unit making, at Step 408, a decision as to which video rate to use. In this example, it chooses the highest rate that, with the audio, represents a total bit-rate requirement less than or equal to $R_T$, viz.:

if $R_T \geq 44.8$ choose V3
if $44.8 > R_T \geq 24.8$ choose V2
if $24.8 > R_T \geq 14.8$ choose V1
if $R_T < 14.8$ 5 transmission is not possible; exit at Step 409.

Once this decision has been made, the control unit then proceeds at Step 410 to read video data from the relevant file to the TCP interface 11. It should be stressed that the initial part of this video data is contemporary (in terms of the original recorded material) with the audio already sent. Inherent in Step 410, but conventional and hence not shown explicitly, are flow control (analogous to Step 401), flow control feedback from the receiving terminal (so that the amount of data received does not cause buffer overflow) and the possibility of switching to a higher or lower rate video file in the event that network conditions improve or deteriorate, respectively.

One issue that should be considered, though, is the fact that, because, during the start-up phase, only audio has been sent, the audio buffer at the receiving terminal is ahead of the video buffer. This may be considered desirable (to a degree at least) in providing a greater resilience to short-term network problems for the audio than for the video, so that in the event of packet loss causing video buffer underflow and hence loss of video at the receiving terminal, the user may continue to listen to the accompanying sound. But, if desired, the video streaming Step 410 may temporarily, during an initial period of this second phase, slow down or even suspend transmission of audio data, until the contents of the audio and video buffers at the receiving terminal reach either equality (in terms of playing time) or some other specified relationship. Naturally this has the benefit of increasing the amount of video data that can be sent during this initial period.

Possible modifications to the arrangements shown in FIG. 1 include:

(a) The use of a UDP interface, with TFRC congestion control, as discussed in the introduction, in place of the TCP interface 11. In this case, because TFRC explicitly calculates the actual transmitting rate, it may be possible to dispense with the monitoring unit 13 and instead read the transmitting rate $R_T$ directly from the UDP/TFRC interface. Recognition of the end of slow start may still be performed as shown in Step 404 of the flowchart by comparing $R_T$ and $R_P$; alternatively it may be possible to recognize it by observing when the packet loss reaches a specified level.

(b) The above description assumed that one would choose the highest video rate that the network would support; however the option also exists of deliberately choosing a lower rate in order to reduce or even eliminate the delay that occurs at the receiving terminal while the receiver video buffer is being filled to an acceptable level. Such measures are discussed in our international patent application no. PCT/GB 01/05246 (Publication no. WO 02/45372).

(c) The above description assumed that the video and audio data originated from stored files. However this method may be applied to the transmission of a live feed, provided that the server includes additional buffering so that the video can be held at the server during the initial period of audio-only transmission.

(d) Alternative audio rates can be accommodated provide a criterion can be found whereby a decision between them can be made without recourse to any information about current network conditions. An example of this might be of an internet service that can be accessed via different access routes having vastly different bandwidths, perhaps via a standard (PSTN) telephone line and a 56 kbit/s modem on the one hand and an ADSL connection at 500 kbit/s on the other. If the system has two alternative audio rates, say 4.8 kbit/s and 16 kbit/s and one makes the reasonable assumption that the PSTN connection can never support the higher rate and the ADSL connection always can, then if the server is informed by the receiving terminal (either automatically or manually) as to which type of access line is in use it can make a decision of which of the two audio rates to choose, based on this information alone. Once that decision has been made, the process can proceed in the manner already described.

In principle, the streaming method we have described will work with a conventional receiver. However, the benefits of the proposed method will be gained only if the receiver has the characteristic that, before beginning to play the received material, it waits until both its audio buffer and its video buffer contain sufficient data. In general, established video standards do not specify this functionality, leaving it to the discretion of the receiver designer. Of the receivers currently available, some have this characteristic whereas others, for example, may begin to decode and play audio as soon as the audio buffer is adequately full, even when no video data have arrived. We recommend that either one chooses a receiver of the former type, or one modifies the receiver control function so as to monitor the buffer contents and to initiate playing only when both buffers contain sufficient data (in accordance with the usual criteria) to support continuous playout.

A second embodiment of the invention will now be described. This is similar to the first, except that it uses layered video coding. That is to say, instead of having several (three, in the above example) different versions of the video source only one of which is sent, one has a base layer source, which can be decoded by itself to give a low-quality video output and an enhancement layer which is useless by itself but can be decoded together with the base layer to produce a higher quality video output; and one may have further enhancement layers each of which is usable only in combination with the base layer and the intervening layer(s). In this example we also suppose that multiple (non-layered) audio rates are available. We recall that in the slow-start phase one has to transmit data in advance of deciding between the various alternative sources, and that the rationale of choosing to transmit the audio first was that since there was only one audio rate one knew that this would inevitably have to be transmitted, whatever the rate decision. In this second example with alternative audio rates this ceases to be the case, since neither audio stream qualifies as "always to be transmitted". However the video base layer does so qualify, and thus in this case one proceeds by commencing transmission of the video base layer in Step 402. Then in step 408 one selects the video and audio rates to be used and in Step 410 commences transmission of the selected audio and the enhancement layer(s), if any, appropriate to the chosen video rate. In this instance, when transmitting enhancement layer video it would be appropriate to cease transmitting base layer video until all the enhancement layer video contemporary with the base layer video already sent has been transmitted.

Of course, if only a single audio rate were used, then both audio and base layer video could be sent during the slow-start phase.

A third embodiment, similar to the second, uses video encoded using frame rate scalability in accordance with the MPEG4 standard. An encoded MPEG sequence consists of I-frames (encoded using intra-frame coding only), P-frames (encoded using inter-frame differential coding based on the content of a preceding I-frame) and B-frames (encoded using bi-directional inter-frame prediction based on neighboring I and P-frames). A typical MPEG sequence might be IBBPBBPIBBP etc. In frame rate scaleable coding one transmits for the lowest bit-rate stream just the I-frames; for a higher bit-rate stream, the I and P-frames, and for a higher still bit-rate, all the frames. In this instance one proceeds by transmitting only I-frames at Step 402 during the slow-start phase.

A yet further example is the transmission of a page for display (a "web page") consisting of text and graphics. The idea here is slightly different from the preceding examples in that we are not now concerned with the transmission of material that has to be presented to the user in real time. Nevertheless, it is considered advantageous to provide, as we provide here, for alternative graphics resolutions. So the store 10 contains text, for example in the form of an html file, and separate image files corresponding to one or more images which the receiving terminal is to display, in conventional manner, as part of a composite display. For each image there are several, perhaps three, image files stored in the store 10, at three different resolutions. The text, or the beginning of it, is transmitted in Step 402 during the slow-start phase. At Step 408 a decision is made, based on the available transmitting rate $R_T$, as to which resolution to choose, the idea being that one chooses the highest resolution that allows the images to be transmitted in a reasonable period. The exit at 409 is not necessary in this case. Then at step 410 the remaining text (if any) is transmitted, followed by the file of the chosen resolution for the or each image. If the chosen files are renamed with filenames corresponding to those embedded in the text (i.e. independent of the resolution) then no modification at the receiving terminal is necessary and it can display the composite page using a standard web browser.

What is claimed is:

1. A method of transmitting data initially in a start-up mode over a network having initially undetermined transmission capacity, in which the data comprises a single first part including no alternatives therein relating to different resolutions and at least two alternative second parts in which the at least two alternative independent second parts respectively corresponding to different independently alternative resolutions which may be independently transmitted without regard for the other alternative second part(s), for synchronized presentation at a receiving terminal simultaneously with the first part, said method comprising:

(a) in an initial start-up mode for starting data transmission over a particular communications channel, initially transmitting at least an initial portion of only the single first part;

(b) receiving data indicative of the available transmission capacity for said initial transmission in step (a);

(c) choosing one from among the alternative independent second parts corresponding to respectively different resolutions for immediate transmission following step (b) in a second phase of said start-up mode, as a function of the data indicative of the available transmission capacity received in step (b); and (d) thereafter, in a third phase of said start-up mode, transmitting only the chosen one independent second part and any remainder of the single first part for synchronized presentation at a receiving terminal simultaneously with the first part during said initial start-up mode, thereby quickly achieving initial transmission of said second part at a resolution suited to available transmission capacity.

2. A method according to claim 1 including the step of generating said data indicative of the available transmission capacity by monitoring the transmission by the network of the said initial portion of the single first part.

3. A method according to claim 1 in which, in an initial time period of step (d), transmission of a leading part of the chosen second part of an extent corresponding to the extent of the single first part already transmitted is performed preferentially to, or to the exclusion of, further transmission of the single first part, thereby causing the transmission of the synchronized second part to catch up with its corresponding first part.

4. A method for transmitting related audio and video digitized data representing an audio-visual presentation over a communications network having an initially undetermined transmission capacity wherein the audio data includes only a single version thereof, said method comprising:

(a) initially transmitting digitized audio data of said audio-visual presentation over a communications network without corresponding related digitized video data;

(b) determining available transmission capacity of the communications network based on said initial transmission of audio data for which there is only a single version to be transmitted;

(c) selecting one of plural corresponding but different resolution related digitized video data of said audio-visual presentation as a function of the determined available transmission capacity; and (d) thereafter continuing to transmit (i) said digitized audio data in the same single available version as previously transmitted, and (ii) the selected resolution related digitized video data over said communications network as selected in step (c) to provide a coordinated audio-video presentation.

\* \* \* \* \*